US009959721B1

(12) United States Patent
Zhang et al.

(10) Patent No.: US 9,959,721 B1
(45) Date of Patent: May 1, 2018

(54) ANTI-THEFT SYSTEM AND OPERATING METHOD THEREOF

(71) Applicant: Primax Electronics Ltd., Taipei (TW)

(72) Inventors: Shi-Jie Zhang, Taipei (TW); Che-Yen Huang, Taipei (TW); Ying-Che Tseng, Taipei (TW); Wen-Pin Hsieh, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days. days.

(21) Appl. No.: 15/585,612

(22) Filed: May 3, 2017

(30) Foreign Application Priority Data

Jan. 20, 2017 (TW) .............................. 106102162 A

(51) Int. Cl.
G05B 19/42 (2006.01)
G08B 13/14 (2006.01)
H04B 17/318 (2015.01)
H04W 4/02 (2018.01)

(52) U.S. Cl.
CPC ....... *G08B 13/1427* (2013.01); *H04B 17/318* (2015.01); *H04W 4/021* (2013.01)

(58) Field of Classification Search
CPC ...... H04W 24/08; H04W 4/008; G08B 21/24; G01S 3/046; G01S 5/0027; G06F 3/0481; G05B 19/042; G01C 21/165
USPC ............ 340/539.15, 539.13, 539.11, 539.21, 340/572.1; 455/426.1, 552.1
See application file for complete search history.

(56) References Cited

U.S. PATENT DOCUMENTS

| 5,223,815 A * | 6/1993 | Rosenthal .......... | G08B 13/1427 340/531 |
| 7,843,327 B1* | 11/2010 | DiMartino ......... | G08B 13/1409 340/505 |
| 8,102,256 B2* | 1/2012 | Scalisi ................. | G01C 21/165 340/539.13 |
| 2008/0001814 A1* | 1/2008 | Durst .................... | G01S 5/0027 342/357.55 |

(Continued)

FOREIGN PATENT DOCUMENTS

| CN | 105993162 A | 9/2014 |
| TW | I452542 B | 9/2014 |

*Primary Examiner* — George Bugg
*Assistant Examiner* — Munear Akki
(74) *Attorney, Agent, or Firm* — Muncy, Geissler, Olds & Lowe, P.C.

(57) ABSTRACT

An anti-theft system and an operating method are provided. The anti-theft system includes a wearable device and a portable electronic device. The wearable device includes a first wireless module and a first processing module. The portable electronic device includes a second wireless module, a second processing module and a positioning module. The first wireless module and the second wireless module are in a wireless connection with each other. The second wireless module detects a received signal strength indicator value of the wireless connection. If the received signal strength indicator value is lower than a predetermined signal strength value, the positioning module is enabled to generate plural position data within a predetermined time period. Moreover, the second processing module calculates a displacement of the portable electronic device according to the plural position data and determines whether a warning mode is enabled according to the displacement.

6 Claims, 4 Drawing Sheets

(56) References Cited

U.S. PATENT DOCUMENTS

| | | | |
|---|---|---|---|
| 2013/0234853 A1* | 9/2013 | Kazerouni | G08B 13/1427 340/572.1 |
| 2015/0084769 A1* | 3/2015 | Messier | G08B 21/0261 340/539.13 |
| 2015/0105029 A1* | 4/2015 | Russell | H04W 4/008 455/67.11 |
| 2015/0156647 A1* | 6/2015 | Braun | H04W 24/08 455/426.1 |
| 2015/0247913 A1* | 9/2015 | Messier | G01S 5/0027 340/539.13 |
| 2016/0026837 A1* | 1/2016 | Good | G06F 19/327 340/539.13 |
| 2016/0335876 A1* | 11/2016 | Verma | G01S 11/06 |
| 2017/0045866 A1* | 2/2017 | Hou | H04L 12/2803 |
| 2017/0157511 A1* | 6/2017 | Feghali | A63F 13/323 |
| 2017/0269790 A1* | 9/2017 | Grandi | G06F 3/0481 |

* cited by examiner

ANTI-THEFT SYSTEM AND OPERATING METHOD THEREOF

FIELD OF THE INVENTION

The present invention relates to a field of retrieving a portable electronic device, and more particularly to a system and a method of retrieving a portable electronic device through a wearable device.

BACKGROUND OF THE INVENTION

Modern people pay more and more attention on the life quality and the physical health. Consequently, many wearable physiological detection devices such as smart watches and smart bracelets are gradually favored by consumers. Through the smart watches and smart bracelets, the user can accurately measure and record the courses of exercises or daily lives.

A method of using the smart watch or the smart bracelet will be described as follows. Firstly, a user account is created through an application program (e.g., APP). Then, the gender, the age, the height, the weight and/or any other required information are inputted into the user account. Meanwhile, the exercise time, the distance, the calorie consumption, the walking quantity and the sleep quality can be calculated and recorded by the smart watch or the smart bracelet. Moreover, the user can set the exercise target and the sleep target through the application program. If the user does not follow the exercise schedule or the user fails to reach the exercise target, the smart watch or the smart bracelet will properly generate a prompt to the user.

Moreover, the data, records or histories of exercise or sleep stored in the smart watch or the smart bracelet can be transmitted to the computer or the smart phone in a Bluetooth transmission manner, a Wi-Fi transmission manner or any other appropriate wireless transmission manner.

While the smart watch or the smart bracelet is used, the user has to simultaneously carry a portable electronic device such as a smart phone or a personal digital assistant (PDA). Since the smart watch or the smart bracelet is in wireless communication with the portable electronic device, the user can operate the portable electronic device to set the system parameters of the smart watch or the smart bracelet. However, since the portable electronic device (e.g., the smart phone or the personal digital assistant) is usually placed in the pocket or backpack of the user, the portable electronic device may be carelessly lost in some place when the user moves or exercises outdoors. The existing smart watch or smart bracelet is usually equipped with an anti-lost or anti-theft system. For example, an anti-theft monitoring system with a wireless radio frequency signal transmitter and a wireless radio frequency signal receiver is disclosed in Taiwanese Patent No. TWI452542. When the wireless radio frequency signal receiver receives signal, the wireless radio frequency signal receiver generates a normal voltage level or an abnormal voltage level. According to the normal voltage level or the abnormal voltage level, the anti-theft monitoring system determines whether an anti-theft monitoring mode is enabled. Moreover, an anti-lost system is disclosed in China Patent Publication No. CN105993162A. This anti-lost system uses an infrared ray or a distance sensor to detect the distance between the smart bracelet and the portable electronic device.

However, the conventional technologies still have some drawbacks. For example, if the voltage level generated by the wireless radio frequency signal receiver in response to the received signal is used as the basis of determining whether the anti-theft monitoring mode is enabled, the data transmission of the portable electronic device may readily result in voltage change. Under this circumstance, the possibility of causing the erroneous operation of the anti-theft/warning mode increases. On the other hand, if the infrared ray or the distance sensor is used to detect the distance between the smart bracelet and the portable electronic device, the obstacles or environment factors may readily result in erroneous calculation. Moreover, the erroneous operation of the anti-theft/warning mode confuses the user of the portable electronic device.

Therefore, there is a need of providing an approach of assisting the user in retrieving the lost portable electronic device and avoiding the erroneous operation of the anti-theft/warning mode of the portable electronic device.

SUMMARY OF THE INVENTION

The present invention provides an anti-theft system and an operating method thereof. The warning mode is enabled when two judging conditions are satisfied. Consequently, the erroneous operation of the anti-theft/warning mode of the portable electronic device can be effectively avoided.

In accordance with an aspect of the present invention, there is provided an anti-theft system. The anti-theft system includes a wearable device and a portable electronic device. The wearable device includes a first wireless module and a first processing module. The portable electronic device includes a second wireless module, a second processing module and a positioning module. The first wireless module and the second wireless module are in a wireless connection with each other. The second wireless module detects a received signal strength indicator value of the wireless connection. If the received signal strength indicator value is lower than a predetermined signal strength value, the positioning module is enabled to generate plural position data within a predetermined time period. Moreover, the second processing module calculates a displacement of the portable electronic device according to the plural position data and determines whether a warning mode is enabled according to the displacement.

In an embodiment, the positioning module is a global positioning system module, a Bluetooth positioning module, a Wi-Fi positioning module or a GPRS/CDMA positioning module.

In an embodiment, the wearable device is a smart watch or a smart bracelet.

In an embodiment, the portable electronic device is a notebook computer, a tablet computer, a personal digital assistant, a smart phone or a game console.

In an embodiment, the first wireless module and the second wireless module are radio frequency wireless transmission module, Bluetooth wireless transmission modules, ZigBee wireless transmission modules or Wi-Fi wireless transmission modules.

In an embodiment, the first processing module and the second processing module are microcontroller units.

In accordance with another aspect of the present invention, there is provided an anti-theft system. The anti-theft system includes a wearable device and a portable electronic device. The wearable device includes a first wireless module, a first processing module and a first positioning module. The portable electronic device includes a second wireless module, a second processing module and a second positioning module. The first wireless module and the second wireless module are in a wireless connection with each other. The second wireless module detects a received signal strength indicator value of the wireless connection. If the received signal strength indicator value is lower than a predetermined signal strength value, the first positioning module and the second positioning module are enabled to respectively generate plural wearable device position data and plural portable electronic device position data within a predetermined time period. Moreover, the second processing module calculates a displacement of the portable electronic device according to the plural wearable device position data and the plural portable electronic device position data and determines whether a warning mode is enabled according to the displacement.

In an embodiment, the first positioning module and the second positioning module are global positioning system modules, Bluetooth positioning modules, Wi-Fi positioning modules or GPRS/CDMA positioning modules.

In an embodiment, wherein the wearable device is a smart watch or a smart bracelet.

In an embodiment, the portable electronic device is a notebook computer, a tablet computer, a personal digital assistant, a smart phone or a game console.

In an embodiment, the first wireless module and the second wireless module are radio frequency wireless transmission module, Bluetooth wireless transmission modules, ZigBee wireless transmission modules or Wi-Fi wireless transmission modules.

In an embodiment, the first processing module and the second processing module are microcontroller units.

In accordance with another aspect of the present invention, there is provided an anti-theft system. The anti-theft system includes a wearable device and a portable electronic device. The wearable device includes a first wireless module and a first processing module. The portable electronic device includes a second wireless module, a second processing module and a motion sensing module. The first wireless module and the second wireless module are in a wireless connection with each other. The second wireless module detects a received signal strength indicator value of the wireless connection. If the received signal strength indicator value is lower than a predetermined signal strength value, the motion sensing module is enabled to calculate a displacement of the portable electronic device within a predetermined time period. Moreover, and the second processing module determines whether a warning mode is enabled according to the displacement.

In an embodiment, the motion sensing module is a G-sensor or a gyrometer.

In an embodiment, the wearable device is a smart watch or a smart bracelet.

In an embodiment, the portable electronic device is a notebook computer, a tablet computer, a personal digital assistant, a smart phone or a game console.

In an embodiment, the first wireless module and the second wireless module are radio frequency wireless transmission module, Bluetooth wireless transmission modules, ZigBee wireless transmission modules or Wi-Fi wireless transmission modules.

In an embodiment, the first processing module and the second processing module are microcontroller units.

In accordance with another aspect of the present invention, there is provided an operating method of an anti-theft system including a wearable device and a portable electronic device. The operating method includes the following steps. In a step (a), a wireless connection between the wearable device and the portable electronic device is established. Then, a step (b) is performed to judge whether a received signal strength indicator value of the wireless connection is lower than a predetermined signal strength value. If the received signal strength indicator value is not lower than the predetermined signal strength value, a judging step is performed to judge whether a power button of the portable electronic device is pressed. If the received signal strength indicator value is lower than the predetermined signal strength value, a next step is performed. In a step (c), an operating function of the power button of the portable electronic device is disabled. Then, a step (d) is performed to judge whether a displacement of the portable electronic device is larger than a predetermined distance. If the displacement of the portable electronic device is not larger than the predetermined distance, the step (b) is repeatedly done. If the displacement of the portable electronic device is larger than the predetermined distance, a next step is performed. In a step (e), a warning mode is enabled.

In an embodiment, if the power button of the portable electronic device is pressed in the step (b), turning off the portable electronic device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
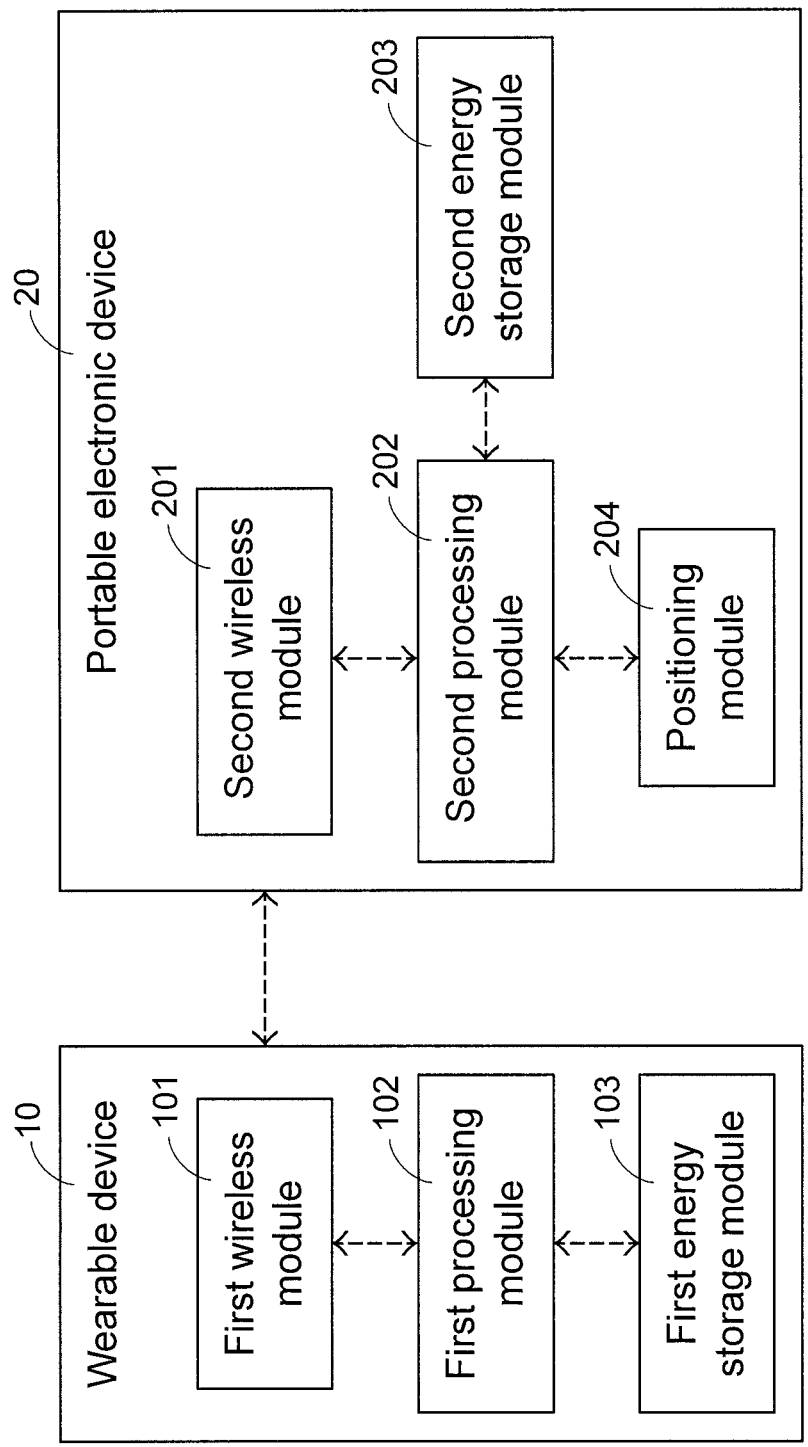
FIG. 1A is a schematic block diagram illustrating the architecture of an anti-theft system according to a first embodiment of the present invention of the present invention.

Please refer to FIG. 1A. FIG. 1A is a schematic block diagram illustrating the architecture of an anti-theft system according to a first embodiment of the present invention of the present invention. As shown in FIG. 1A, the anti-theft system comprises a wearable device 10 and a portable electronic device 20. An example of the wearable device 10 includes but is not limited to a smart watch or a smart bracelet. An example of the portable electronic device 20 includes but is not limited to a notebook computer, a tablet computer, a personal digital assistant, a smart phone or a game console. The wearable device 10 comprises a first wireless module 101, a first processing module 102 and a first energy storage module 103. The portable electronic device 20 comprises a second wireless module 201, a second processing module 202, a second energy storage module 203 and a positioning module 204. The first wireless module 101 and the second wireless module 201 are radio frequency (RF) wireless transmission module, Bluetooth wireless transmission modules, ZigBee wireless transmission modules or Wi-Fi wireless transmission modules. The first processing module 102 and the second processing module 202 are microcontroller units (MCUs). The first energy storage module 103 and the second energy storage module 203 are carbon-zinc batteries, alkaline batteries, nickel-metal hydride batteries, nickel-cadmium batteries or lithium batteries. An example of the positioning module 204 includes but is not limited to a global positioning system (GPS) module, a Bluetooth positioning module, a Wi-Fi positioning module or a GPRS/CDMA positioning module. Within a predetermined time period (e.g., 3~20 seconds), the positioning module 204 generates plural position data with time stamps according to a sequence of a timeline.

Firstly, the first wireless module 101 of the wearable device 10 and the second wireless module 201 of the portable electronic device 20 are in a wireless connection with each other to perform a pairing operation. Moreover, the first wireless module 101 and the second wireless module 201 transmit and receive information through the wireless connection. The first energy storage module 103 is used for providing electric power to the wearable device 10. The electric quantity information of the first energy storage module 103 is also transmitted to the portable electronic device 20 through the wireless connection. The first processing module 102 is used for detecting a received signal strength indicator (RSSI) value of the wireless connection and judging whether the RSSI value is lower than a predetermined signal strength value.

Please refer to FIG. 1A again. The second wireless module 201 of the portable electronic device 20 and the first wireless module 101 of the wearable device 10 are in the wireless connection with each other to perform the pairing operation. Moreover, the second wireless module 201 and the first wireless module 101 transmit and receive information through the wireless connection. The user can set the system parameters of the portable electronic device 20. For example, the system parameters include the predetermined signal strength value, a predetermined distance, a network cloud space position/address and/or an emergency contact person's phone number. For example, the predetermined signal strength value is −100 dbm. The predetermined signal strength value may be varied according to the user's requirements or the application types of the first wireless module 101 and the second wireless module 201. The second energy storage module 203 is used for providing electric power to the portable electronic device 20. The electric quantity information of the second energy storage module 203 is also transmitted to the wearable device 10 through the wireless connection. The positioning module 204 detects the displacement of the portable electronic device 20 and generates the position data of the portable electronic device 20 according to the sequence of the timeline. The second processing module 202 is used for detecting the RSSI value of the wireless connection between the first wireless module 101 and the second wireless module 201 and judging whether the RSSI value is lower than the predetermined signal strength value. If the RSSI value is lower than the predetermined signal strength value, the operating function of a power button (not shown) of the portable electronic device 20 is immediately locked and disabled by the portable electronic device 20. At the time when the power button of the portable electronic device 20 is locked, the positioning module 204 of the portable electronic device 20 generates a first position data. Moreover, the positioning module 204 generates a second position data according to the sequence of the timeline within the predetermined time period (e.g., 3~20 seconds). According to the first position data and the second position data, the second processing module 202 calculates a displacement of the portable electronic device 20 within the predetermined time period and judges whether the displacement is larger than the predetermined distance. For example, the predetermined distance is in the range between 3 and 5 meters. The predetermined distance may be varied according to the practical requirements.

If the displacement of the portable electronic device 20 is larger than the predetermined distance, a warning mode of the portable electronic device 20 is enabled. In the warning mode, a built-in display module (not shown) or a built-in sound generation module (not shown) of the portable electronic device 20 generates a warning message to notify/warn the unknown person who picks up or steals the portable electronic device 20. Moreover, the warning message, the first position data or the second position data is transmitted from the second processing module 202 to the wearable device 10 through the second wireless module 201. After the warning message, the first position data or the second position data is received by the wearable device 10, a built-in vibration module (not shown) of the wearable device 10 provides a vibration prompt, or built-in display module (not shown) or a built-in sound generation module (not shown) of the wearable device 10 shows the first position data, the second position data or the warning message. Consequently, the user realizes that the portable electronic device 20 is possibly lost.

In the warning mode, a built-in image pickup module (not shown) of the portable electronic device 20 captures an image of the environment or the sound module (not shown) of the portable electronic device 20 acquires the sound of the environment. Through the second wireless module 201, the captured environment image or the acquired environment sound is uploaded to a network cloud space that is preset by the user. When the user reads the environment image or the environment sound from the network cloud space through another electronic device, the user may guess the possible position of the lost portable electronic device 20 according to the environment image or the environment sound. Moreover, the portable electronic device 20 may issue the warning message, the first position data or the second position data to the mobile phone of the emergency contact person through the second wireless module 201.

Figure 1B:
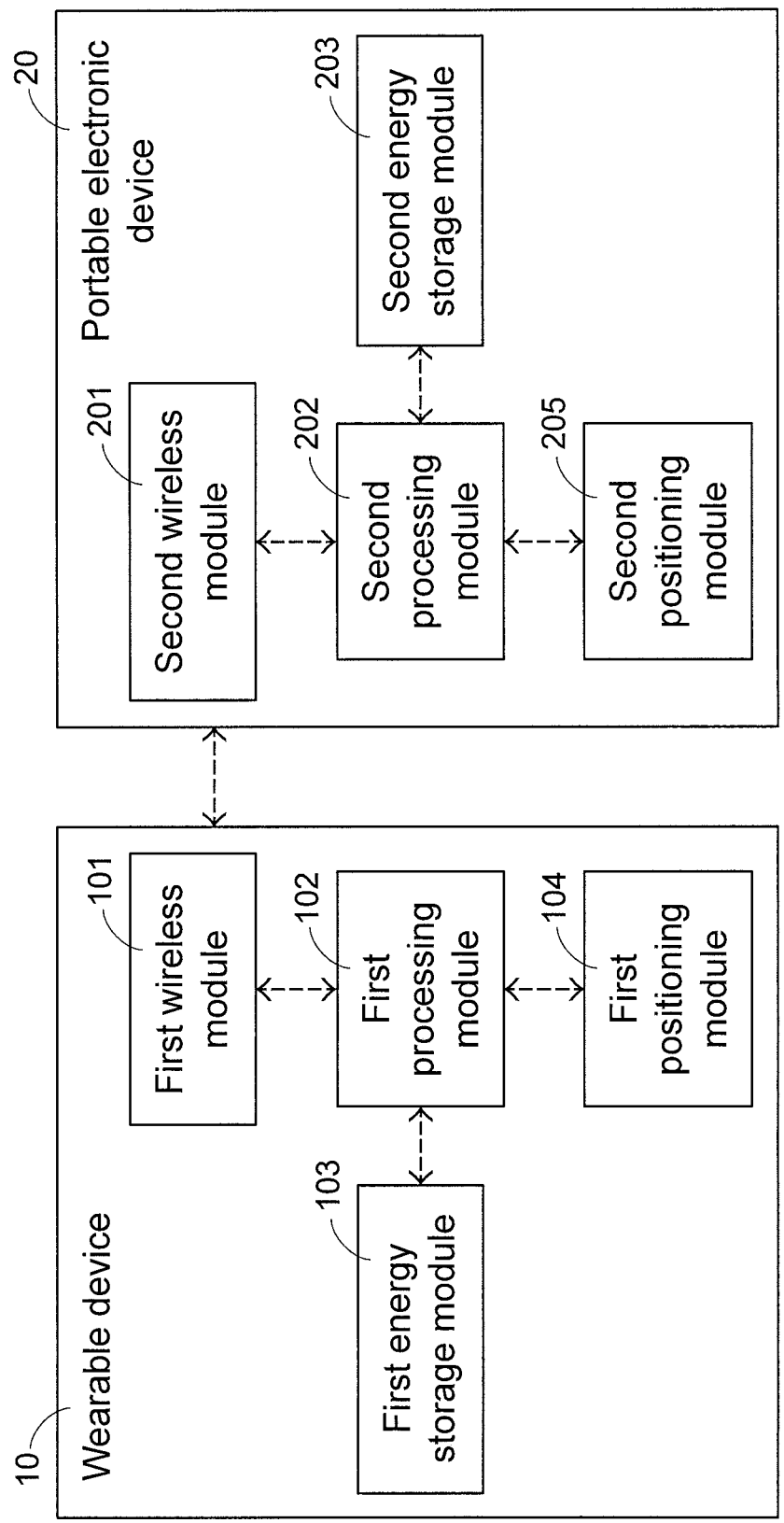
FIG. 1B is a schematic block diagram illustrating the architecture of an anti-theft system according to a second embodiment of the present invention of the present invention.

Please refer to FIG. 1B. FIG. 1B is a schematic block diagram illustrating the architecture of an anti-theft system according to a second embodiment of the present invention of the present invention. As shown in FIG. 1B, the anti-theft system comprises a wearable device 10 and a portable electronic device 20. The first wireless module 101, the first processing module 102 and the first energy storage module 103 of the wearable device 10 and the second wireless module 201, the second processing module 202 and the second energy storage module 203 of the portable electronic device 20 are similar to those of FIG. 1A, and are not redundantly described herein. In comparison with FIG. 1A, the wearable device 10 further comprises a first positioning module 104, and the portable electronic device 20 comprises a second positioning module 205. The first positioning module 104 and the second positioning module 205 are GPS modules, Bluetooth positioning modules, Wi-Fi positioning modules or GPRS/CDMA positioning modules. If the RSSI value of the wireless connection between the first wireless module 101 and the second wireless module 201 is lower than the predetermined signal strength value, the first positioning module 104 of the wearable device 10 and the second positioning module 205 of the portable electronic device 20 respectively generate plural wearable device position data and plural portable electronic device position data according to the sequence of the timeline within the predetermined time period (e.g., 3~20 seconds). The plural wearable device position data are transmitted from the first processing module 102 to the portable electronic device 20 through the first wireless module 101. According to the received plural wearable device position data and the plural portable electronic device position data, the second processing module 202 calculates a displacement of the portable electronic device 20 within the predetermined time period (e.g., 3~20 seconds) and judges whether the displacement is larger than the predetermined distance. For example, the predetermined distance is in the range between 13 and 20 meters. The predetermined distance may be varied according to the practical requirements.

If the displacement of the portable electronic device 20 is larger than the predetermined distance, a warning mode of the portable electronic device 20 is enabled. Moreover, a warning message or the plural portable electronic device position data are transmitted from the second processing module 202 to the wearable device 10 through the second wireless module 201. After the warning message or the plural portable electronic device position data are received by the wearable device 10, a built-in vibration module (not shown) of the wearable device 10 provides a vibration prompt, or built-in display module (not shown) or a built-in sound generation module (not shown) of the wearable device 10 shows the warning message or the plural portable electronic device position data. Consequently, the user realizes that the portable electronic device 20 is possibly lost. Moreover, the portable electronic device 20 may issue the warning message, the first position data and the plural portable electronic device position data to the mobile phone of the emergency contact person through the second wireless module 201.

Figure 1C:
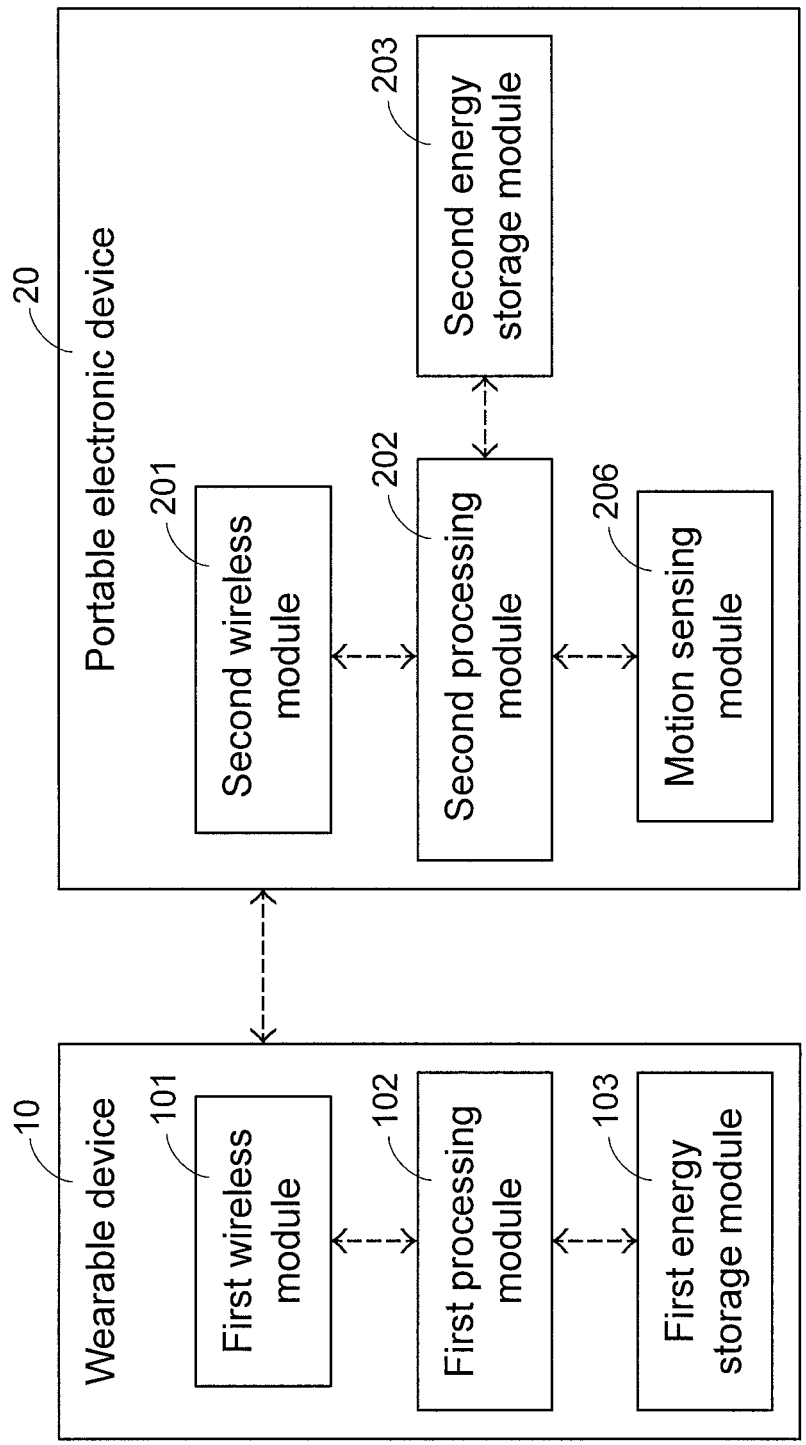
FIG. 1C is a schematic block diagram illustrating the architecture of an anti-theft system according to a third embodiment of the present invention of the present invention.

Please refer to FIG. 1C. FIG. 1C is a schematic block diagram illustrating the architecture of an anti-theft system according to a third embodiment of the present invention of the present invention. As shown in FIG. 1C, the anti-theft system comprises a wearable device 10 and a portable electronic device 20. The first wireless module 101, the first processing module 102 and the first energy storage module 103 of the wearable device 10 and the second wireless module 201, the second processing module 202 and the second energy storage module 203 of the portable electronic device 20 are similar to those of FIG. 1A, and are not redundantly described herein. In comparison with FIG. 1A, the portable electronic device 20 comprises a motion sensing module 206. For example, the motion sensing module 206 is a G-sensor or a gyrometer. If the RSSI value of the wireless connection between the first wireless module 101 and the second wireless module 201 is lower than the predetermined signal strength value, the portable electronic device 20 enables the motion sensing module 206. Moreover, the motion sensing module 206 detects a displacement of the portable electronic device 20 within the predetermined time period (e.g., 3~20 seconds). The second processing module 202 judges whether the displacement of the portable electronic device 20 is larger than the predetermined distance. For example, the predetermined distance is in the range between 3 and 5 meters. The predetermined distance may be varied according to the practical requirements.

If the displacement of the portable electronic device 20 is larger than the predetermined distance, a warning mode of the portable electronic device 20 is enabled. Moreover, a warning message, the first position data or the second position data is transmitted from the second processing module 202 to the wearable device 10 through the second wireless module 201. After the warning message is received by the wearable device 10, a built-in vibration module (not shown) of the wearable device 10 provides a vibration prompt, or built-in display module (not shown) or a built-in sound generation module (not shown) of the wearable device 10 shows the warning message. Consequently, the user realizes that the portable electronic device 20 is possibly lost. Moreover, the portable electronic device 20 may issue the warning message to the mobile phone of the emergency contact person through the second wireless module 201.

Figure 2:
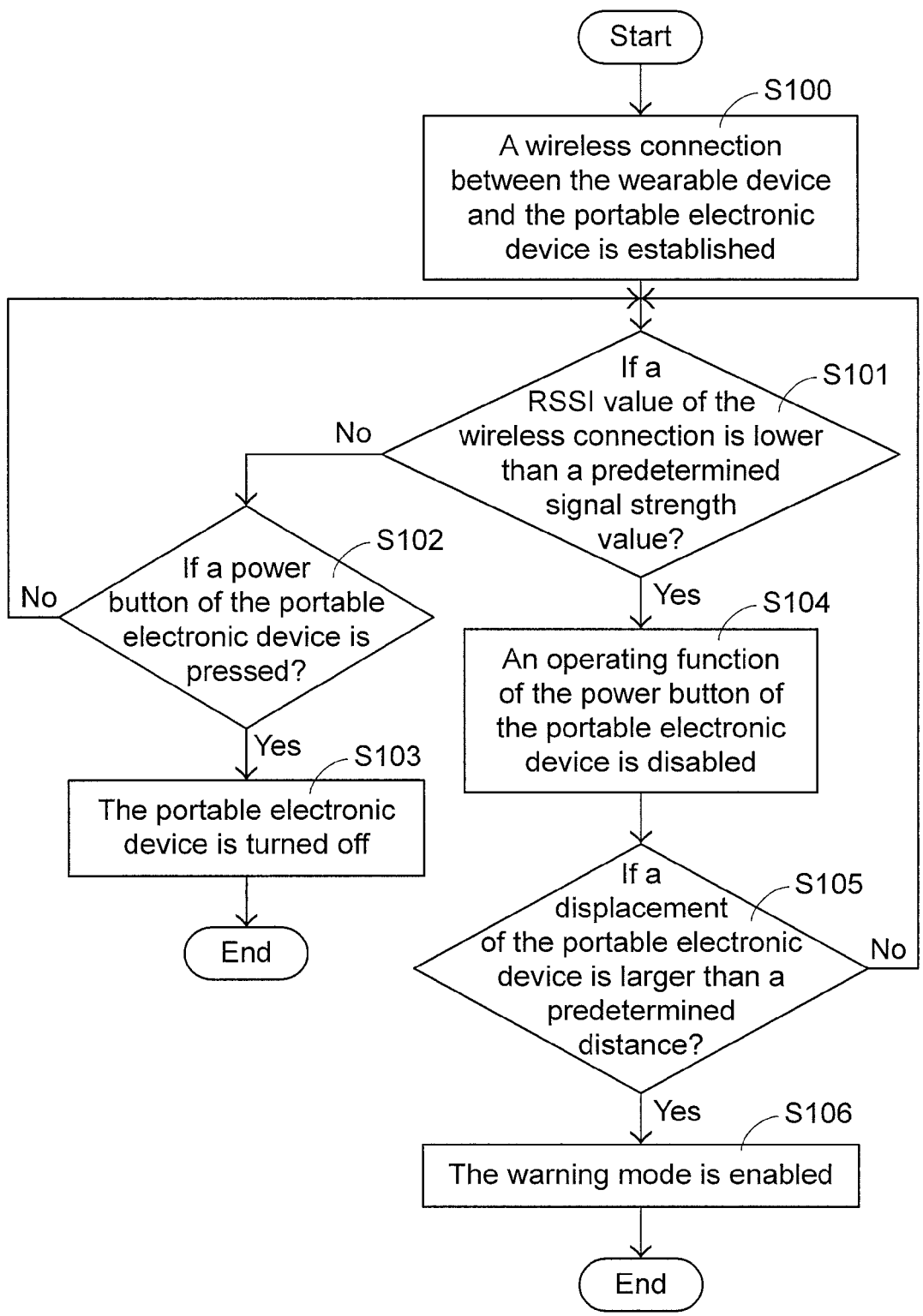
FIG. 2 is a flowchart illustrating an operating method of an anti-theft system according to an embodiment of the present invention of the present invention.

Please refer to FIGS. 1A~1C and FIG. 2. FIG. 2 is a flowchart illustrating an operating method of an anti-theft system according to an embodiment of the present invention of the present invention. Firstly, a wireless connection between the wearable device 10 and the portable electronic device 20 is established (Step S100). In the step S100, the user operates the portable electronic device 20 to create the wireless connection between the wearable device 10 and the portable electronic device 20 in order to perform a pairing process. Moreover, the user can set the system parameters of the portable electronic device 20. For example, the system parameters include the predetermined signal strength value, a predetermined distance, a network cloud space position/address and/or an emergency contact person's phone number. Then, the second processing module 202 judges whether a RSSI value of the wireless connection is lower than the predetermined signal strength value (Step S101). In the step S101, the predetermined signal strength value is −100 dbm or in the range between −73 and −68 dbm. If the RSSI value is higher than the predetermined signal strength value in the step S101, a step S102 is performed to judge whether a power button of the portable electronic device 20 is pressed. If the judging condition of the step S102 is satisfied, it means that the power button of the portable electronic device 20 has been pressed. Then, the portable electronic device 20 is turned off (Step S103). If the judging condition of the step S102 is not satisfied, the step S101 is repeatedly done.

If the RSSI value is lower than the predetermined signal strength value in the step S101, an operating function of the power button of the portable electronic device 20 is disabled (Step S104). In the step S104, the power button of the portable electronic device 20 is locked. Consequently, the portable electronic device 20 cannot be turned off. Then, the second processing module 202 judges whether a displacement of the portable electronic device 20 is larger than a predetermined distance (Step S105). In the step S105, the second processing module 202 uses the positioning module (e.g., the positioning module 204, the first positioning module 104 or the second positioning module 205) to calculate the displacement of the portable electronic device 20 according to the position data generated in the sequence of the timeline, or the second processing module 202 uses the motion sensing module 206 to detect the displacement of the portable electronic device 20. For example, the predetermined distance is in the range between 3 and 5 meters or in the range between 13 and 20 meters.

If the displacement of the portable electronic device 20 is smaller than the predetermined distance in the step S105, the step S101 is repeatedly done. Whereas, if the displacement of the portable electronic device 20 is larger than a predetermined distance in the step S105, a warning mode is enabled (Step S106). In the warning mode, a built-in display module (not shown) or a built-in sound generation module (not shown) of the portable electronic device 20 generates a warning message to notify/warn the unknown person who picks up or steals the portable electronic device 20. Consequently, the efficacy of warning or deterring the unknown person is achieved. Moreover, the warning message or the position data of the portable electronic device 20 are transmitted from the second processing module 202 to the wearable device 10 through the second wireless module 201. After the warning message or the position data of the portable electronic device 20 are received by the wearable device 10, a built-in vibration module (not shown) of the wearable device 10 provides a vibration prompt, or built-in display module (not shown) or a built-in sound generation module (not shown) of the wearable device 10 shows the position data of the portable electronic device 20 or the warning message. Consequently, the user realizes that the portable electronic device 20 is possibly lost. Moreover, a built-in image pickup module (not shown) of the portable electronic device 20 captures an image of the environment or the sound module (not shown) of the portable electronic device 20 acquires the sound of the environment. Through the second wireless module 201, the captured environment image or the acquired environment sound is uploaded to a network cloud space that is preset by the user. When the user reads the environment image or the environment sound from the network cloud space through another electronic device, the user may guess the possible position of the lost portable electronic device 20 according to the environment image or the environment sound. Moreover, the portable electronic device 20 may issue the warning message, the first position data or the second position data to the mobile phone of the emergency contact person through the second wireless module 201.

In the embodiments of FIGS. 1A~1C, the positioning module or the motion sensing module is used to detect the displacement of the portable electronic device 20. In some embodiments, the portable electronic device comprises both of the positioning module and the motion sensing module. That is, the components of detecting the displacement of the portable electronic device is not limited to only one of the positioning module and the motion sensing module.

From the above descriptions, the anti-theft system and the operating method of the present invention confirm whether the portable electronic device is lost according to the RSSI value of the wireless connection between the wearable device and the portable electronic device and the displacement of the portable electronic device. When compared with the conventional technologies, the technology of the present invention is effective to avoid the erroneous operation of the warning mode. After the warning mode is enabled, the warning message and the position data of the lost portable electronic device can be transmitted to the mobile phone of the emergency contact person. Moreover, the captured environment image or the acquired environment sound can be uploaded to a network cloud space that is preset by the user. Consequently, the possibility of retrieving the portable electronic device is largely increased. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An anti-theft system, comprising:
a wearable device comprising a first wireless module, a first processing module and a first positioning module; and
a portable electronic device comprising a second wireless module, a second processing module and a second positioning module, wherein the first wireless module and the second wireless module are in a wireless connection with each other, and the second wireless module detects a received signal strength indicator value of the wireless connection,
wherein if the received signal strength indicator value is lower than a predetermined signal strength value, the first positioning module and the second positioning module are enabled to respectively generate plural wearable device position data and plural portable electronic device position data within a predetermined time period, and the second processing module calculates a displacement of the portable electronic device according to the plural wearable device position data and the plural portable electronic device position data and determines whether a warning mode is enabled according to the displacement.

2. The anti-theft system according to claim 1, wherein the first positioning module and the second positioning module are global positioning system modules, Bluetooth positioning modules, Wi-Fi positioning modules or GPRS/CDMA positioning modules.

3. The anti-theft system according to claim 1, wherein the wearable device is a smart watch or a smart bracelet.

4. The anti-theft system according to claim 1, wherein the portable electronic device is a notebook computer, a tablet computer, a personal digital assistant, a smart phone or a game console.

5. The anti-theft system according to claim 1, wherein the first wireless module and the second wireless module are radio frequency wireless transmission module, Bluetooth wireless transmission modules, ZigBee wireless transmission modules or Wi-Fi wireless transmission modules.

6. The anti-theft system according to claim 5, wherein the first processing module and the second processing module are microcontroller units.

* * * * *